(12) United States Patent
Lin et al.

(10) Patent No.: US 9,342,870 B2
(45) Date of Patent: May 17, 2016

(54) TREE-BASED LINEAR REGRESSION FOR DENOISING

(71) Applicant: Adobe Systems Incorporated, San Jose, CA (US)

(72) Inventors: Zhe Lin, Fremont, CA (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 94 days.

(21) Appl. No.: 14/060,076

(22) Filed: Oct. 22, 2013

(65) Prior Publication Data

US 2015/0110386 A1    Apr. 23, 2015

(51) Int. Cl.
*G06K 9/62*    (2006.01)
*G06T 5/00*    (2006.01)

(52) U.S. Cl.
CPC ....... *G06T 5/002* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 2008/0002908 A1* | 1/2008 | Chinen | ................... | G06T 5/002 382/274 |
| 2008/0007747 A1* | 1/2008 | Chinen | ................... | G06T 5/002 358/1.9 |
| 2011/0188770 A1* | 8/2011 | Weinberger | ............... | G06K 9/40 382/255 |
| 2012/0201436 A1* | 8/2012 | Oakley | .................. | G06T 3/4053 382/128 |
| 2012/0224789 A1* | 9/2012 | Chatterjee | ............... | G06T 5/002 382/275 |
| 2013/0071041 A1* | 3/2013 | Jin | ........................ | G06T 3/4053 382/254 |
| 2014/0119664 A1* | 5/2014 | Ioffe | .................. | G06K 9/00261 382/195 |
| 2014/0153817 A1* | 6/2014 | Lin | ......................... | G06K 9/68 382/154 |
| 2014/0153819 A1* | 6/2014 | Lin | ........................ | G06T 5/002 382/159 |
| 2014/0219552 A1* | 8/2014 | Porikli | .................... | G06T 5/002 382/155 |
| 2015/0131915 A1* | 5/2015 | Lin | ......................... | G06T 5/002 382/205 |

OTHER PUBLICATIONS

Burger, Harold Christopher, Christian J. Schuler, and Stefan Harmeling. "Image denoising: Can plain Neural Networks compete with BM3D?." Computer Vision and Pattern Recognition (CVPR), 2012 IEEE Conference on. IEEE, 2012.*

(Continued)

*Primary Examiner* — Bhavesh Mehta
*Assistant Examiner* — Narek Zohrabyan
(74) *Attorney, Agent, or Firm* — Wolfe-SBMC

(57) ABSTRACT

Image denoising techniques are described. In one or more implementations, a denoising result is computed by a computing device for a patch of an image. One or more partitions are located by the computing device that correspond to the denoising result and a denoising operator is obtained by the computing device that corresponds to the located one or more partitions. The obtained denoising operator is applied by the computing device to the image.

19 Claims, 7 Drawing Sheets

(56) References Cited

OTHER PUBLICATIONS

Brox, Thomas, Oliver Kleinschmidt, and Daniel Cremers. "Efficient nonlocal means for denoising of textural patterns." Image Processing, IEEE Transactions on 17.7 (2008): 1083-1092.*

Liu, Ce, et al. "Automatic estimation and removal of noise from a single image." Pattern Analysis and Machine Intelligence, IEEE Transactions on 30.2 (2008): 299-314.*

Buades, Antoni, Bartomeu Coll, and Jean-Michel Morel. "A review of image denoising algorithms, with a new one." Multiscale Modeling & Simulation 4.2 (2005): 490-530.*

Zhu, Xiang, and Peyman Milanfar. "Automatic parameter selection for denoising algorithms using a no-reference measure of image content." Image Processing, IEEE Transactions on 19.12 (2010): 3116-3132.*

Mosseri, Inbar, Maria Zontak, and Michal Irani. "Combining the power of internal and external denoising." Computational Photography (ICCP), 2013 IEEE International Conference on. IEEE, 2013.*

Zhou, Yipin. "Explore the Power of External Data in Denoising Task.", (https://cs.brown.edu/research/pubs/theses/masters/2014/zhou.yipin.pdf) retreived Mar. 31, 2015.*

Dabov, Kostadin, et al. "Image denoising by sparse 3-D transform-domain collaborative filtering." Image Processing, IEEE Transactions on 16.8 (2007): 2080-2095.*

Patidar, Pawan, et al. "Image de-noising by various filters for different noise." International Journal of Computer Applications (0975-8887) vol. (2010).*

Zontak, Maria, and Michal Irani. "Internal statistics of a single natural image." Computer Vision and Pattern Recognition (CVPR), 2011 IEEE Conference on. IEEE, 2011.*

Burger, Harold Christopher, Christian Schuler, and Stefan Harmeling. "Learning how to combine internal and external denoising methods." Pattern Recognition. Springer Berlin Heidelberg, 2013. 121-130.*

Jancsary, Jeremy, Sebastian Nowozin, and Carsten Rother. "Loss-specific training of non-parametric image restoration models: A new state of the art." Computer Vision—ECCV 2012. Springer Berlin Heidelberg, 2012. 112-125.*

Barnes, Connelly, et al. "PatchMatch: a randomized correspondence algorithm for structural image editing." ACM Transactions on Graphics—TOG 28.3 (2009): 24.*

Burger, Harold Christopher, Christian J. Schuler, and Stefan Harmeling. "Image denoising with multi-layer perceptrons, part 1: comparison with existing algorithms and with bounds." arXiv preprint arXiv:1211.1544 (2012).*

Jain, Viren, and Sebastian Seung. "Natural image denoising with convolutional networks." Advances in Neural Information Processing Systems. 2009.*

Aharon, et al., "K-SVD: An Algorithm for Designing Overcomplete Dictionaries for Sparse Representation", IEEE Transactions on Signal Processing, vol. 54, No. 11, Nov. 11, 2006, pp. 4311-4322.

\* cited by examiner

TREE-BASED LINEAR REGRESSION FOR DENOISING

BACKGROUND

With the inclusion of image capture devices as part of an ever increasing number and variety of devices, the amount of images and the settings in which those images are captured is ever increasing. For example, users have ready access to an image capture device in a variety of different settings through inclusion on mobile phones, tablet computers, and so on.

Because of the variety in settings, however, the images may become noisy (e.g., corrupted), such as due to limitations of the setting (e.g., low light, dusty) and even limitations of the image capture device itself, such as due to limitations in capturing motion, resolution, sensitivity, and so forth. Consequently, this noise may interfere with a user's enjoyment of the actual image itself.

SUMMARY

Image denoising techniques are described. In one or more implementations, a denoising result is computed by a computing device for a patch of an image. One or more partitions are located by the computing device that correspond to the denoising result and a denoising operator is obtained by the computing device that corresponds to the located one or more partitions. The obtained denoising operator is applied by the computing device to the image.

In one or more implementations, a patch is predicted for each of a plurality of noisy patches taken from an image by a computing device by leveraging both a denoising operator learned from a database of patches that are external to the image and a set of self-similar patches of the patch that are included in the image. The image is recovered by aggregating the predicted patches that overlap.

In one or more implementations, a system includes one or more modules implemented at least partially in hardware. The one or more modules are configured to perform operations that include forming a plurality of partitions of training samples of images according to clean patches taken from the images that have that have relatively little to no noise, calculating a denoising operator for each partition, and providing the calculated denoising operator for use in performing a denoising operation for an image in response to identification of at least one partition that corresponds to a denoising result for a patch of the image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Image denoising techniques may be utilized to remove noise (e.g., corruption) from an image that may be introduced by an image capture device (resolution and light sensitivity, an environment in which the image was captured (e.g., low light), and so on). Although conventional techniques have been introduced to remove noise from an image, these conventional techniques may result in blurring, consume a significant amount of resources (e.g., due to a training size problem for training-based methods), and so on.

Image denoising techniques are described herein. In one or more implementations, a patch-based approach is leveraged for image denoising that combines use of similar patches in the same image and from a set of training images of an external database. For example, clean patches from the training images may serve as a basis to form partitions (e.g., collections) in the external database and thus serve as patches that are "external" to an image being denoised. The partitions of the external database may then be used to learn a denoising operator for each partition that, when applied to an image to be denoised, reduces and even eliminates noise in the image. Thus, the denoising operator has a corresponding partition that served as the basis for learning the denoising operator, which may then be used in a denoising operation.

For example, self-similarity may be used to compute an initial denoising result for a noisy patch in an image. The initial denoising result may then be used to locate one or more of partitions that correspond to that noisy patch. The learned denoising operator that corresponds to the one or more partitions may then be applied to the noisy patch from the image to denoise the image.

In the following discussion, an example environment is first described that is operable to perform the image denoising techniques described herein. Example procedures are then described, which may be performed in the example environment. However, it should be noted that the example environment is not limited to performance of the example procedures and the example procedures are not limited to performance in the example environment, the discussion of which being examples thereof.

Example Environment

Figure 1:
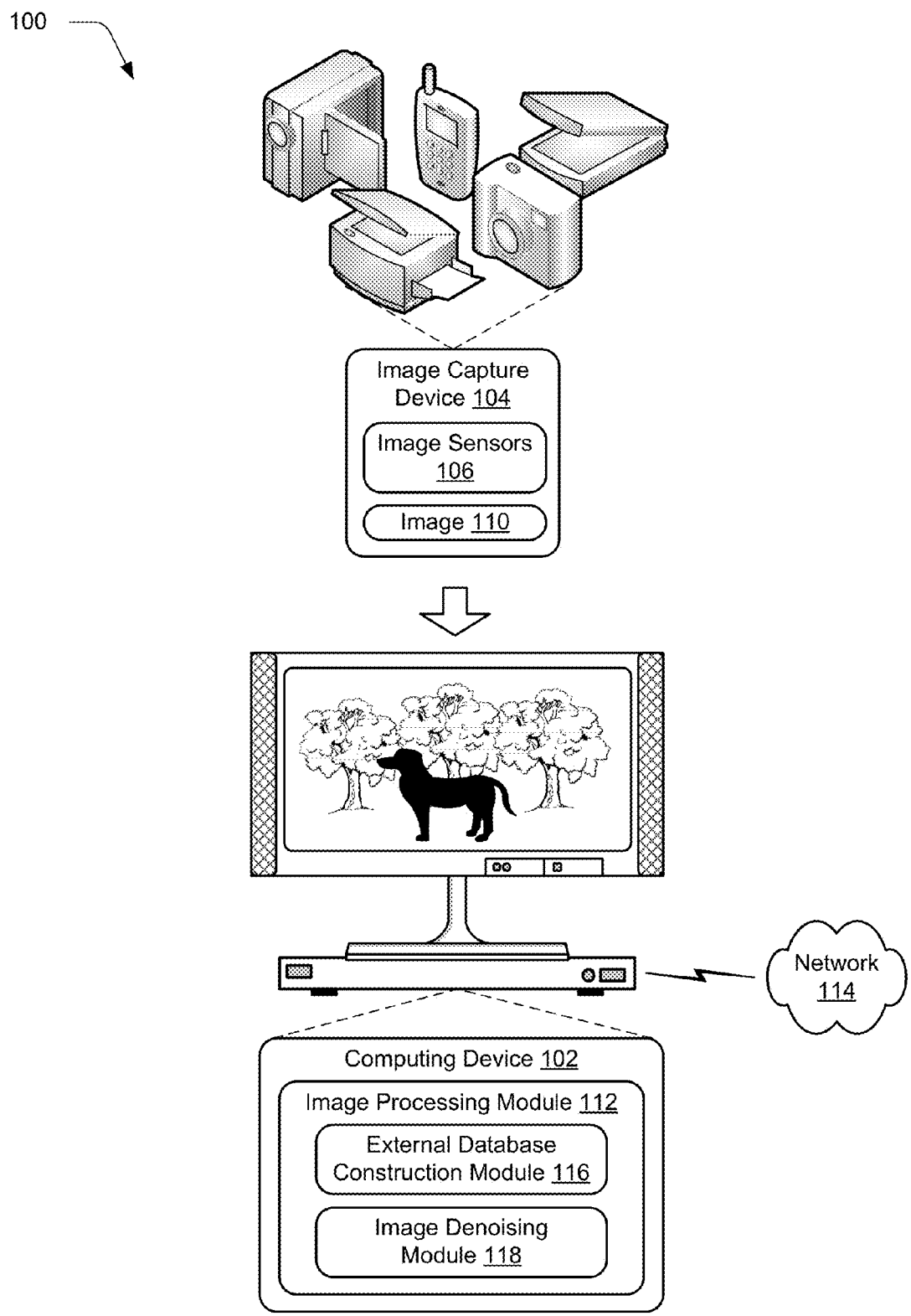
FIG. 1 is an illustration of an environment in an example implementation that is operable to employ image denoising techniques described herein.

FIG. 1 is an illustration of an environment 100 in an example implementation that is operable to employ denoising techniques described herein. The illustrated environment 100 includes a computing device 102 and a plurality of examples of an image capture devices 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The image capture device 104 may also be configured in a variety of ways. Illustrated examples of such configurations include a standalone camera such as a dedicated device, part of a mobile phone or tablet, and so on. Other examples are also contemplated. For example, each of the image capture device 104 may be configured as a single camera, scanner, copier, mobile device (e.g., smart phone), and so forth. Additionally, although illustrated separately the image capture device 104 may be incorporated as part of the computing device 102, e.g., following the smart phone or tablet example above.

The image capture device 104 is illustrated as including image sensors 106 (e.g., a charge coupled device) that are configured to capture an image 110. The image 110, for instance, may be formed as a digital image having data describing values captured by the image sensors 106. Accordingly, the image 110 may be configured in a variety of different ways, such as representative in a raw image format, consistent with a Bayer pattern, a RGB image format, and so forth.

The computing device 102 is illustrated as including an image processing module 112. The image processing module 112 is representative of functionality to perform one or more techniques that are usable to process an image. Although illustrated as implemented locally on the computing device, functionality of the image processing module may also be implemented in a distributed environment, remotely via a network 114 (e.g., "over the cloud") as further described in relation to FIG. 7, and so on.

An example of image processing that may be performed by the image processing module 112 is represented as an external database construction module 116 and an image denoising module 118. The external database construction module 116 is representative of functionality to generate an external database of patches that may be used in denoising the image 110, further discussion of which may be found in relation to FIG. 2. The image denoising module 118 is representative of functionality to denoise the image 110, which may include use of patches taken from the image 110 as well as by leveraging denoising operators taken from the external database constructed by the external database construction module 116. Further discussion of image denoising performed by the image denoising module 118 may be found in relation to FIG. 3.

In the following discussion, techniques are described in which patch recurrence in the same image and different images are combined to perform image denoising. This may be performed based on several insights. The first insight is that the space of training samples may be partitioned and a denoising operator may be learned for each partition. In one or more implementations, the partition may be sufficiently fine-grained so that the training cost is small and thus overcomes limitations of conventional training techniques, e.g., approximately 100,000 to 1,000,000 partitions. The second insight is that although it is generally not feasible to partition a space of the noisy patches directly, a space including clean patches may be partitioned because the latter has greater sparsity than the noisy patches as further described below. The third insight is that given a noisy patch, patch recurrence in the same image may be used to obtain an approximate clean version that can be used to find the partition.

For example, the external database construction module 116 may partition a large set of natural image patches during training into clusters according to the clean patches. A denoising operator may then be trained by the image denoising module 118 for each cluster. For instance, a hierarchical k-means technique may be used to perform the clustering. Additionally, the clustering may be performed on mean-extracted patches to reduce patch complexity. In one or more implementations, relatively small patch sizes (e.g., 5×5) are used with fine-grained partitions (e.g., approximately 100,000 to 1,000,000 partitions) to ensure the patch space is sufficiently represented by the set of cluster centers. Different noisy/clean patch pairs for various types and strengths of noise may then be generated from the partitions, which serve as a basis for learning the denoising operator.

The external database may then be leveraged by the image denoising module 118 to perform denoising. First, self-similarity may be used to compute an initial denoising result for a patch in the image 110 by the image denoising module 118. Each patch of the image 110 may then be leveraged to locate a corresponding partition of the external database. Learned denoising operators that correspond to the located partition may then be applied to the patch. Mean values of the patch are computed from the initial denoising result, and may be added back to the result after applying the learned denoising operators.

Thus, this approach leverages both cues from self-similarity and external databases by combining them in a unified, tree-based learning framework. The use of external databases complements the lack of self-similar examples within the image, and the use of self-similarity cues allows partitioning of the space of image patches with relatively small, noise-free patches thereby permitting learning tasks to be performed in an efficient manner. Further description of this and other examples may be found in the following discussion and shown in the corresponding figures.

Problem Formulation

Let $\{Y, X\}$ represent a pair of noisy and clean images. The image 110 may be represented through overlapping square patches of size "s×s," i.e., "$Y=\{y_i\}_{i=1 \ldots N}$" and "$X=\{x_i\}_{i=1 \ldots N}$," where "$\{y_i, x_i\}$" refers to a corresponding pair of noisy and clean patches. In the following discussion, an "s×s" patch refers to an "$s^2$-by-1" vector unless otherwise mentioned.

With a patch-based framework, a clean patch "x" is predicted from a noisy version "y" by leveraging both a denoising operator learned offline from an external patch database and a set of self-similar patches of "y" existing in the same image: "$\{y^i \epsilon Y | d(y^i, y) < \delta\}$" given some distance metric "d." Given these patch-wise predictions, the output image "X" may then be recovered by aggregating each of the resulting predictions (i.e., approximations) "$\{\hat{x}\}$" on overlapping patches.

A model that relates the noisy patch with the clean patch may be expressed as "x=f(y)" where "f" is referred to as a patch denoising operator. In some instances of use of this model, however, an accurate calculation of "f" may be difficult to learn due to the high degree of freedom of the patch vector. Therefore, the denoising calculation component (i.e., DC component) may be separated out from each patch for reducing the patch complexity as:

$$x = x_0 + \Delta x,$$

where "$x_0$=m(x)=[m m ... m]$^T$" refers to the mean vector of the patch "x" (where "m" is the average of each of the elements in "x") and "$\Delta x$" refers to the remaining component "(x−$x_0$)."

Following the above equation, "x" may be predicted by first inferring "$x_0$" and then "$\Delta x$" using the self-similar patches and external patch database respectively, and then aggregate them as follows:

$$\hat{x} = \widehat{x_0} + \widehat{\Delta x}.$$

Assuming "$x_0$" is known, the denoising operator may be defined as a function "g" such that "$\Delta x = g(\Delta y)$," where "$\Delta y = y − x_0$." Given a learned "g," the clean patch "x" may be predicted by:

$$\hat{x} = \widehat{x_0} + g(y − \widehat{x_0}).$$

Since natural image statistics does not provide significant clues on the 'true' mean value of a noisy patch, "$\widehat{x_0}$" is computed directly using a self-similarity-based denoising algorithm. The self-similarity based denoising algorithm may provide a denoising solution "x̃," then "$\widehat{x_0}$ =m(x̃)." The predicted mean "$\widehat{x_0}$" is then used as known information to estimate "$\Delta x$" through the learned denoising operator "g." As "$x_0$" carries most of the information in "x," "g" has a much lower degree of freedom compared with 'f' and so is easier to learn.

External Database Formation

Figure 2:
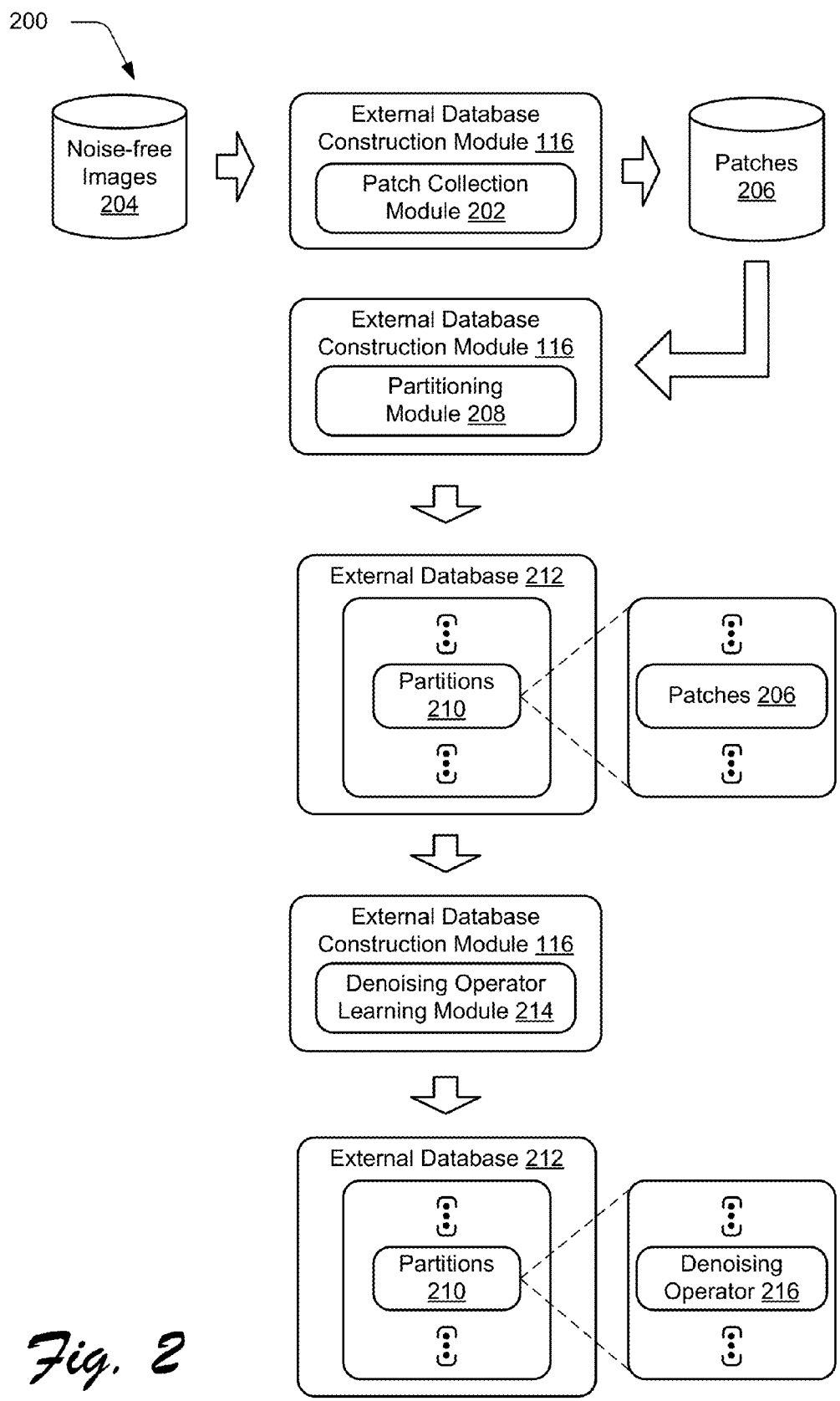
FIG. 2 is an illustration of a system in an example implementation showing an external database construction module of FIG. 1 in greater detail.

FIG. 2 depicts a system 200 in an example implementation showing the external database construction module 116 of FIG. 1 in greater detail as constructing an external database. The external database construction module 116 is illustrated as including a patch collection module 202. The patch collection module 202 is representative of functionality to sample noise-free images 204 to form patches 206. For example, patches 206 may be sampled (e.g., randomly) from a collection of images having little (e.g., low levels) to no noise, which results in a collection of noise-free patches "$\{x_i\}_{i=1}^N$," where "N" is the total number of sampled patches. In the following, "$\{x_i\}_{i=1}^N$" are zero-mean patches, i.e., the sum of vector elements equals to 1.

The patches 206 are then employed by a partitioning module 208 of the external database construction module 116 to form partitions 210 that include respective subsets of the image patches 206. For example, a large set of partitions 210 may be used to capture variation of patches 206 taken from natural images and to make each of the partitions 210 represent a unique structure with low variance. To support this, fine grained partitioning may be performed by the partitioning module 208 as described above, e.g., approximately 100,000 to 1,000,000 partitions.

A hierarchical k-means clustering algorithm may be used by the partitioning module 208 to partition the input patch space that includes the patches 206. The partition (i.e., cluster) centers, which may be thought of as leaf nodes in a tree-like structure, are named as anchor points "$\{c_k\}_{k=1}^N$," for learning regression functions for denoising as further described below. The partitioning process in this example is built using noise-free patches "$\{\Delta x_i\}_{i=1}^N$," which promotes a focus on modeling the natural image statistics with the set of anchor points and excludes the dependency of noise on the tree structure and the anchor points.

The partitions 210 are then utilized by a denoising operator learning module 214 to learn a denoising operator 216 for each of the partitions 210. Continuing with the previous example, noise may be added to the clean patches 206 "$\{x_i\}$" of the external database 212 to derive training patch pairs "$\{y_i, x_i\}_{i=1}^N$" and mean-subtracted data "$\{\Delta y_i, \Delta x_i\}_{i=1}^N$". A denoising operator "g" may then be learned through a locally (or equivalently piece-wise) linear regression model based on the external database 212. This approach may have a variety of advantages, including efficiency and ease of optimization due to linearity.

Given the set of learned anchor points "$\{c_1, \ldots, c_K\}$," any patch "$\Delta x_i$" may be represented as a weighted average of the anchor points that fall into its neighborhood "$N(\Delta x_i)$" as:

$$\Delta x_i = \sum_{c_k \in N(x_i)} \alpha_k c_k.$$

Similar to locally linear embedding (LLE), the weights "$\{\alpha_k\}$" may be estimated as follows:

$$\underset{\{\alpha_k\}}{\text{minimize}} \left\| \Delta x_i - \sum_{c_k \in N(x_i)} \alpha_k c_k \right\|_2^2$$

$$\text{subject to } \sum_k \alpha_k = 1.$$

The following expression "$y_i = x_i + n$" may be used assuming noise is zero-mean and additive, where "n" is a random noise vector. The above equation may then be rewritten as:

$$\Delta y_i = \sum_{c_k \in N(x_i)} \alpha_k c_k + n.$$

Suppose the sub-space of mean-subtracted patch "$Y = \{\Delta y\}$" spans a manifold on the $s^2$-dimensional space on which regression function "g" can be approximated to be locally linear. Then "g" may be learned on the set of anchor points "$\{c_1, \ldots, c_K\}$."

Assuming the function "g" is locally linear, application of the function to the above equation results in the following:

$$g(\Delta y_i) = \sum_{c_k \in N(y_i)} \alpha_k g(c_k) + g(n).$$

Since "n" is a zero-mean noise, it may be assumed that "g(n)=0" for simplicity of learning the function "g." Given the training patch pairs "$\{\Delta y_i, \Delta x_i\}_{i=1}^N$," the function "g" may be learned on the "K" anchor points as follows:

$$\underset{\{g(c_k)\}_{k=1}^K}{\text{minimize}} \sum_{i=1}^N \left\| \Delta x_i - \sum_{c_k \in N(\Delta y_i)} \alpha_k g(c_k) \right\|_2^2,$$

where the regression function at each anchor point takes a linear form: "$g(c_k) = b_k + W_k c_k$," and "$W_k$" is an "$s^2 \times s^2$" matrix and "$B_k$" is a "$s^2 \times 1$" vector. The values "$W_k, b_k$" may be estimated using a least-squares technique. Accordingly, as illustrated a denoising operator 216 may be learned for each of the partitions 210, which may be leveraged to assist in denoising of an image 110, an example of which is described as follows and shown in a corresponding figure.

Denoising Via Linear Regression

Figure 3:
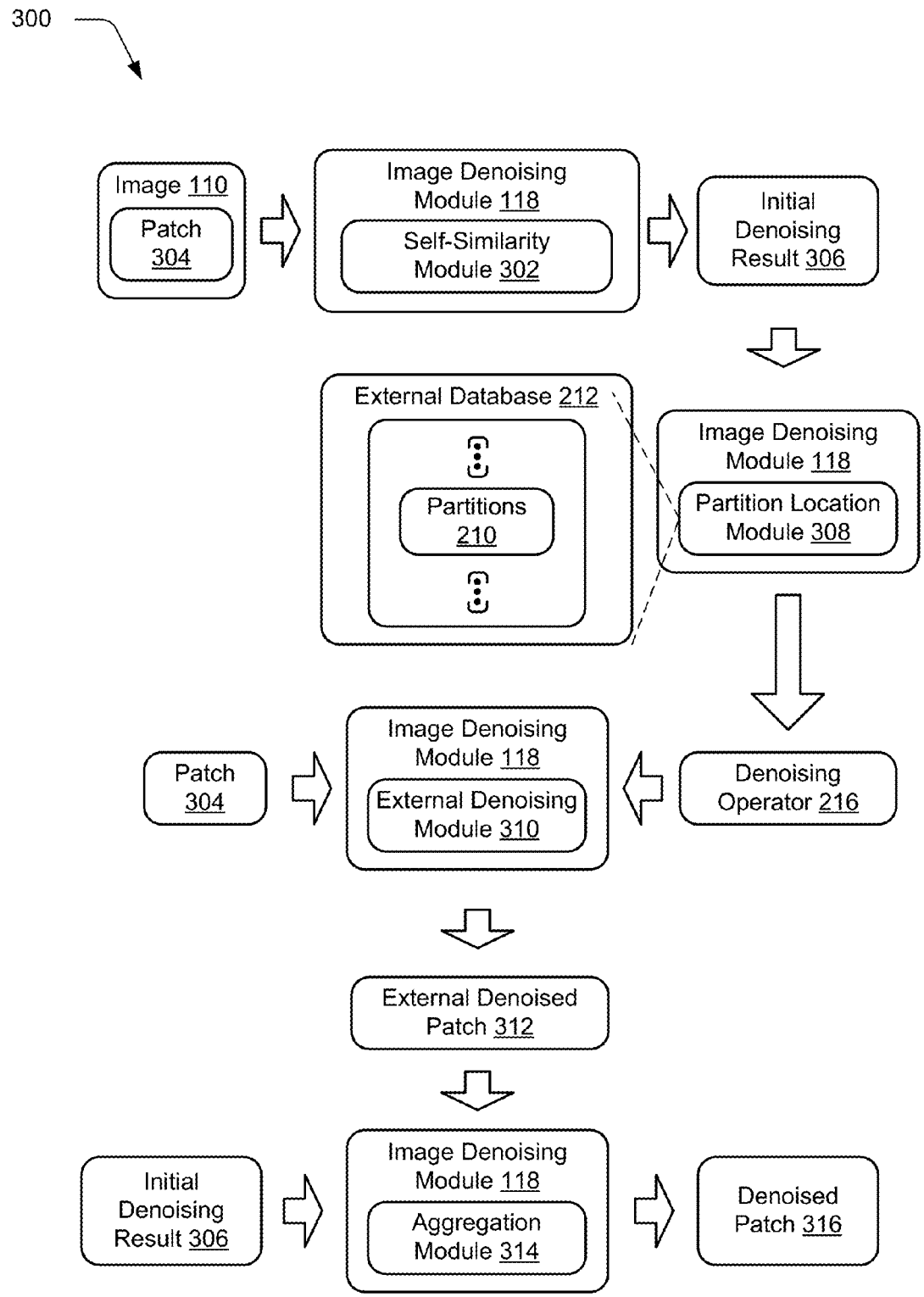
FIG. 3 is an illustration of a system in an example implementation showing an image denoising module of FIG. 1 in greater detail.

FIG. 3 depicts a system 300 in an example implementation showing the image denoising module 118 as employed the external database constructed in FIG. 2 to denoise an image. As the denoising operators are learned on square patches in this example (although other shapes are also contemplated), a noisy image "Y" may be represented with a set of overlapping square patches, i.e., "Y={$y_i$}." To estimate the noise-free patch "$x_i$" from "$y_i$," the DC component "$x_0$" and then remaining component "$\Delta x_i$" are estimated.

The image denoising module 118 is illustrated as including a self-similarity module 302. The self-similarity module 302 is representative of functionality to process a patch 304 (e.g., a "noisy" patch) of the image 110 to obtain an initial denoising result 306. For example, a noise reduced patch "$\tilde{x}_i$" may be approximated with a group of self-similar patches of "$y_i$" in "Y," i.e., "$\{y_i \in Y | d(y^i, y_i) < \delta\}$." Although an ideal "$\tilde{x}_i$" may not have a high peak signal-to-noise ratio, it may still serve to preserve a majority of the details and structures whereas the noise is mostly suppressed. Block matching and hard threshold strategies may also be adopted due to relative simplicity and effectiveness. The DC component of the patch may then be estimated as "$\widehat{x_{i,0}} = m(\tilde{x}_i)$." Other single image denoising approaches may also be adopted to produce "$\widehat{x_0}$" in the framework described herein.

The initial denoising result 306 may then be used by a partition location module 308 of the image denoising module 118 to locate one or more of the partitions 210 in the external database 212 that correspond to the result. In this way, a denoising operator 216 may be found in the external database 212 that corresponds to the initial denoising result 306 through correspondence with the found partitions 210.

The denoising operator 216 is then applied to the patch 304 to generate an external denoised patch 312, i.e., a patch that is denoised by leveraging the external database 212. The external denoised patch 312 may then be used along with the initial denoising result 306 by an aggregation module 314 of the image denoising module 118 to arrive at a denoised patch 316. Thus, the initial denoising result 306 based on self-similarity and the external denoised patch 312 based on the external database 212 may be combined to arrive at the denoised patch 316 for use in denoising the image 110. Overlapping denoised patches 316 may then be combined for individual pixels as a weighted average to arrive at a final denoised result for the image 110 as a whole.

Continuing with the previous example, single image self-similarity-based denoising algorithms may be used to find a transformed test patch to search for matching anchor points using a noise reduced patch to search the tree or anchor points of the external database 212. For instance, the expression "$\Delta y_i = y_i - \widehat{x_0}$" may be used as the query to search for k-nearest anchor points. Then, weights "$\alpha$'s" of the neighboring anchor points may be estimated. The corresponding regression function "g" is applied on "$\Delta y_i$" to generate "$\widehat{\Delta x_t}$," i.e., "$\widehat{\Delta x_t} = g(\Delta y_i)$." Therefore, given a query patch, any approximate nearest neighbor search or k-nearest neighbor search algorithm may be used to find its closest partitions and apply corresponding regression functions, i.e., denoising operators. Finally, for each pixel, predictions from each of the patches "$y_i$" overlapping the pixel are combined as a weighted average, where the weights are computed as "$\beta_j = \exp(-\|\tilde{x}_j - c_k\|_2^2 / h)$."

Implementation Example

In this example, the patch size is set as "s=5" in building the tree, learning the regression functions, and so on. While for generating the initial denoising result, a patch size of "s=8" may be used since this is the typical patch size used for self-similarity-based methods. For hierarchical clustering, the branch factor is set to "B=10," and the maximum depth is set to "L=6," which yields roughly $10^6$ (leaf nodes) anchor points. The tree (anchor points) is built once in this example and used for any noise sigma. But, for different noise sigma, denoising operators may be trained separately to optimize the performance. In practice, these techniques work well even with generic denoising operators trained by mixing samples of various noise strengths. In one or more implementations, when the distance of the initial de-noised patch "$\tilde{x}$" to its corresponding "NN" anchor point is smaller than a pre-defined threshold "$\tau$" (e.g., $\tau = 0:01$), the anchor point itself is directly returned as the regression result without applying the regression, which saves computational resource consumption. With larger trees with more anchor points, more patches are directly replaced in this manner so is expected to be faster while this will be traded off by the increased search time due to the larger tree.

In one or more implementations, 15 million randomly sampled training patch pairs for clustering with hierarchical k-means are utilized, with the number of leaf nodes (anchor points) varying in the range of 10K, 100K, 160K, 330K, 540K, 810K, and 1000K. Locally linear regression functions were then trained on those anchor points. The performance variation were compared with respect to the number of anchor points by evaluating use on standard images with the Gaussian noise set for $\sigma = 30$. It was found in an example that pixel signal-to-noise ratio (PSNR) does not change significantly when the number of anchor points is larger than 100K for each of the standard images. This indicates that 100K anchor points sufficiently represent the variation of the mean-subtracted input patch space for natural image patches. Additionally, this approach may be performed with increased efficiency over convention techniques because B×L patch distance comparisons for each patch or nearest neighbor search operations for each patch are performed, which have a reduced complexity over the conventional techniques.

Figure 4:
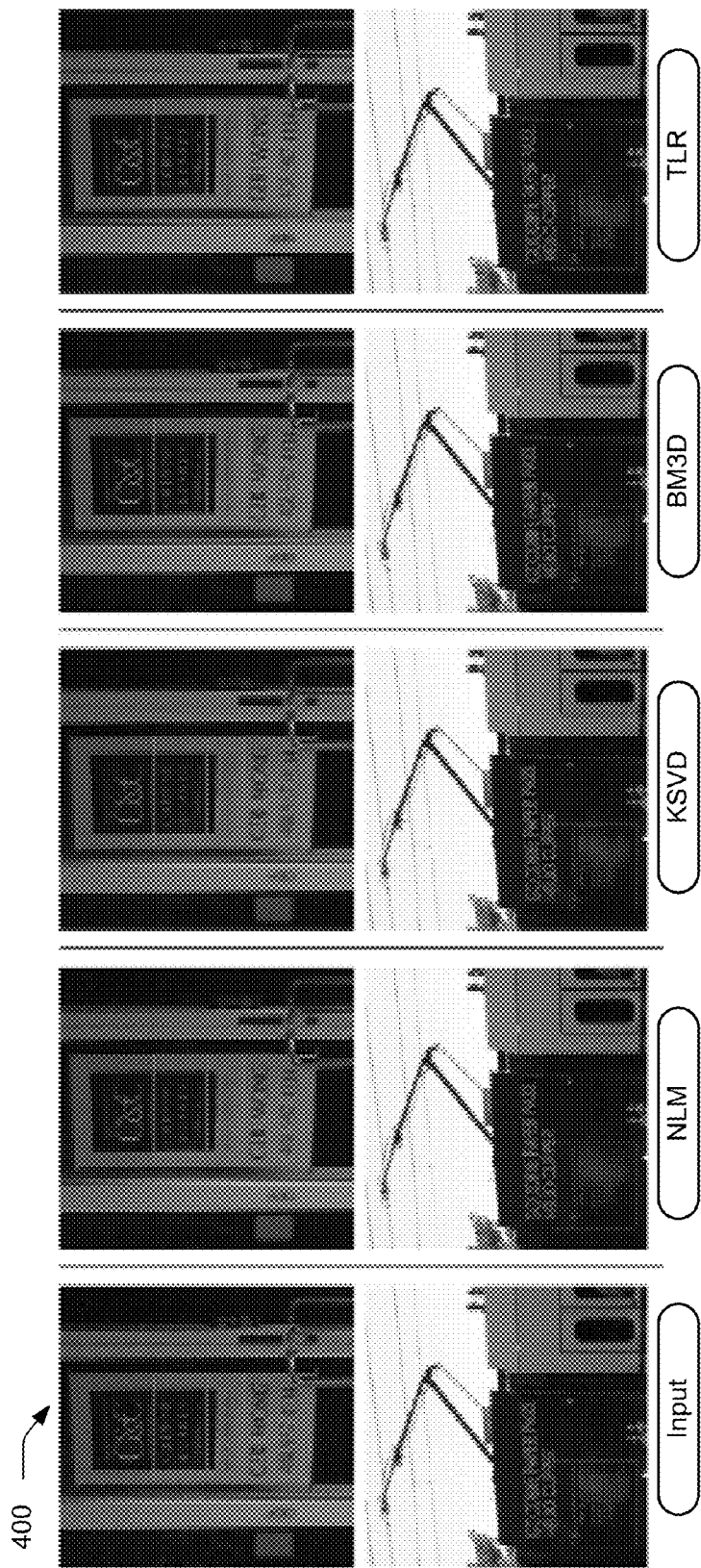
FIG. 4 depicts an example implementation showing comparison of a result of the tree-based linear regression (TLR) image denoising technique described herein with other conventional image denoising techniques.

FIG. 4 depicts an example implementation 400 showing comparison of a result of the tree-based linear regression (TLR) image denoising technique described herein with other conventional image denoising techniques. In FIG. 4, a column showing an example of an input image is shown. Another column is shown showing a result of a tree-based linear regression (TLR) techniques for image denoising techniques described herein. Examples of conventional techniques include the following:

"NLM"—Buades, B. Coll, and J. M. Morel. *A review of image denoising algorithms, with a new one. Multiscale Modeling and Simulation*, 4(2):490-530, 2005;

"KSVD"—M. Aharon, M. Elad, and A. Bruckstein. K-SVD: An algorithm for designing overcomplete dictionaries for sparse representation. IEEE Transactions on Signal Processing, 4(2):490-530, 2005; and "BM3D"—K. Dabov, A. Foi, V. Katkovnik, and K. Egiazarian. Image denoising by sparse 3-d transform-domain collaborative filtering. IEEE TIP, 16(8):2080-2095, 2007.

As illustrated, the techniques described herein outperform these conventional techniques in terms of visual quality, e.g., blurring effect and artifacts produced by imprecise and insufficient collection of self-similar patches. These techniques have also been found to outperform these conventional techniques in terms of pixel signal-to-noise ratio (PSNR). Further discussion of these techniques may be found in relation to the following procedures.

Example Procedures

The following discussion describes image denoising techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 5:
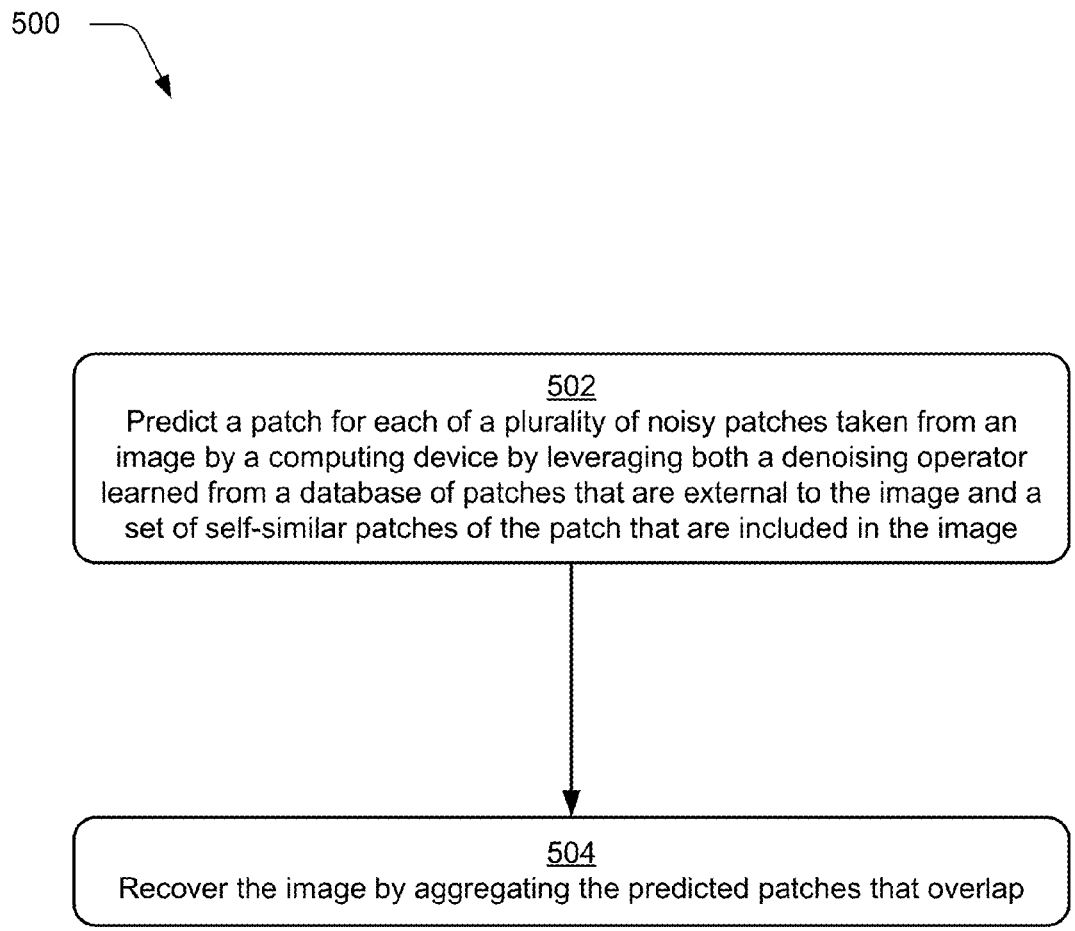
FIG. 5 is a flow diagram depicting a procedure in an example implementation in which external and internal patches are utilized to denoise an image.

FIG. 5 depicts a procedure 500 in an example implementation in which external and internal patches are utilized to denoise an image. A patch is predicted for each of a plurality of noisy patches taken from an image by a computing device by leveraging both a denoising operator learned from a database of patches that are external to the image and a set of self-similar patches of the patch that are included in the image (block 502). For example, the database of patches that are external may be learned "offline" to generate denoising operators that are utilized to denoise a patch of an image. An initial denoising result may be used to locate the patches in the database (e.g., by walking a tree-like structure of the database) as well as utilized in combination with the externally denoised patch to arrive at a prediction for the noisy patch.

The image is recovered by aggregating the predicted patches that overlap (block 504). Continuing with the previous example, the predicted patches that overlay may employ a weighting to arrive at a final denoised result. A variety of other examples are also contemplated without departing from the spirit and scope thereof.

Figure 6:
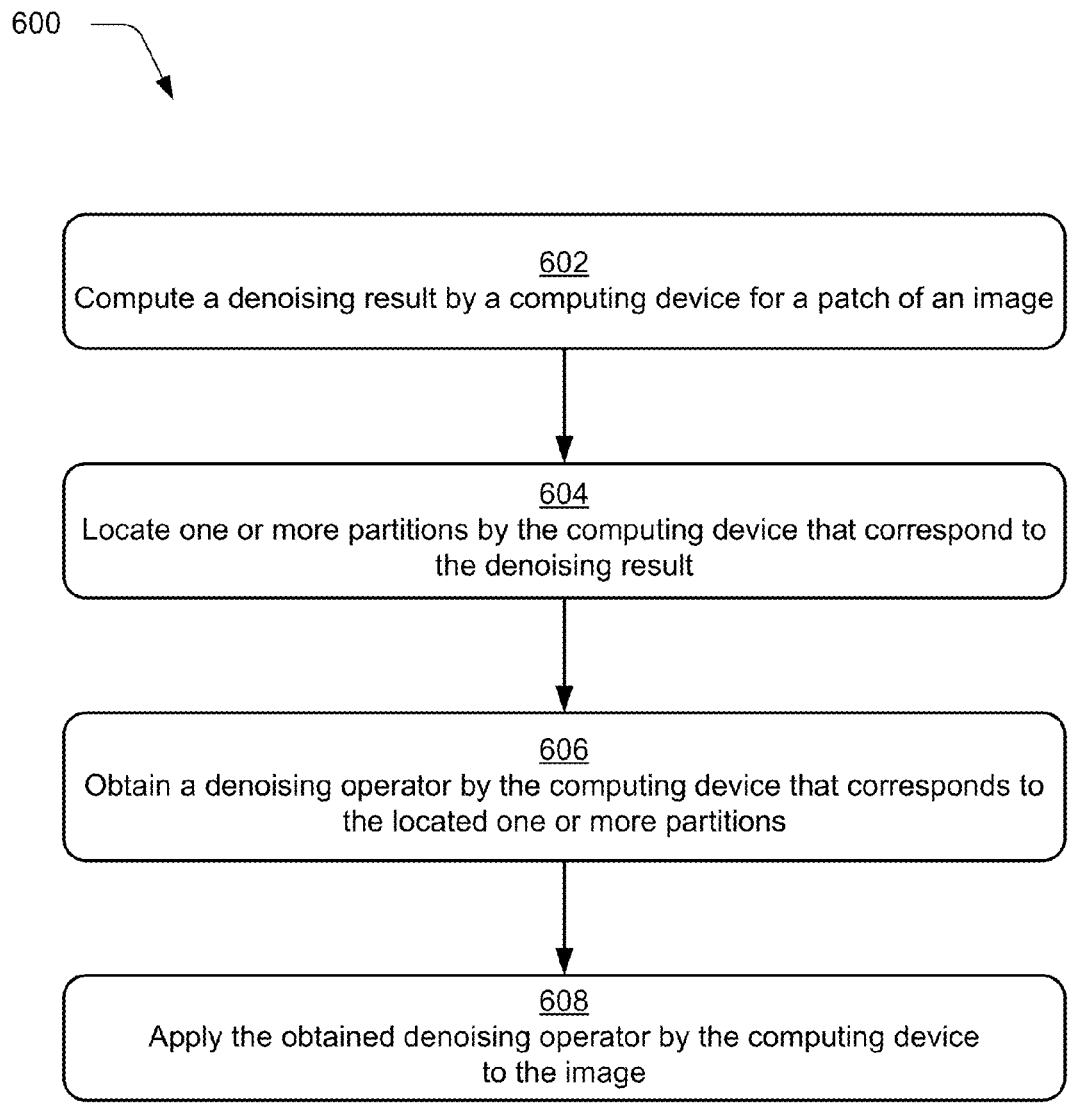
FIG. 6 is a flow diagram depicting a procedure in an example implementation in which a partition of an external database is utilized to assist in denoising an image.

FIG. 6 depicts an example procedure 600 in which partition of an external database is utilized to assist in denoising an image. A denoising result is computed by a computing device for a patch of an image (block 602). This may be performed in a variety of ways, such as through use of self-similarity to other patches in the image.

One or more partitions are located by the computing device that correspond to the denoising result (block 604). Like above, the denoising result may be used to walk a tree-like structure of the external database 212 to locate corresponding partitions 210.

A denoising operator is obtained by the computing device that corresponds to the located one or more partitions (block 606). Each of the partitions 210, for instance, may have a corresponding denoising operator 216. Therefore, location of the partitions 210 may be utilized to find denoising operators that correspond to the patch.

The obtained denoising operator is applied by the computing device to the image (block 608). This may be performed alone, along with the initial denoising result as described above, and so on. A variety of other examples are also contemplated as further described above.

Example System and Device

Figure 7:
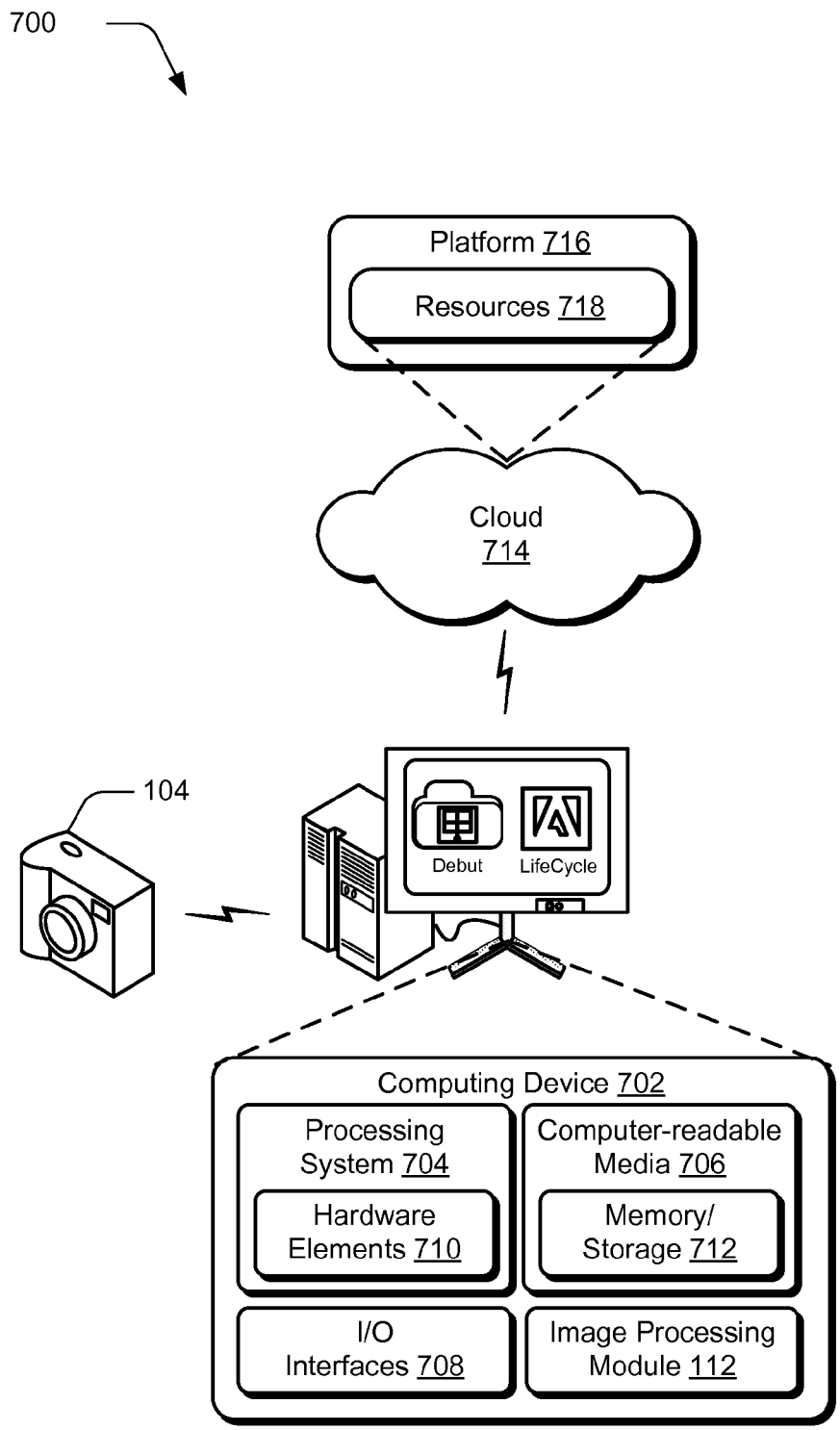
FIG. 7 illustrates an example system generally that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of the image processing module 112, which may be configured to process image data, such as image data captured by an image capture device 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

locating a noisy patch by a computing device within an image to be denoised;

computing an initial denoising result by the computing device for the noisy patch;

locating one or more of a plurality of partitions by the computing device that correspond to the initial denoising result for the noisy patch, each of the plurality of partitions formed as clusters based on clean patches taken from training samples of training images that do not have noise that is to be removed;

obtaining a denoising operator by the computing device associated with the located one or more partitions that correspond to the initial denoising result for the noisy patch and that is learned from the training samples of the training images; and applying the obtained denoising operator by the computing device to the noisy patch to compute a denoising result for the noisy patch.

2. A method as described in claim 1, wherein the denoising operator is locally linear.

3. A method as described in claim 1, wherein the partitions are formed using a hierarchical k-means clustering technique, k-means clustering technique, agglomerative clustering, spectral clustering, or affinity-based clustering.

4. A method as described in claim 1, wherein the denoising operator of respective said partitions is formed using a piece-wise or locally linear regression technique.

5. A method as described in claim 1, wherein the partitions are arranged in a tree-like structure.

6. A method as described in claim 1, wherein the initial denoising result for the noisy patch is computed using a self-similarity technique.

7. A method as described in claim 6, wherein the self-similarity is based at least in part on patch recurrence in the image.

8. A system comprising:
one or more modules implemented at least partially in hardware, the one or more modules configured to perform operations comprising:
forming a plurality of partitions of training samples of training images according to clean patches taken from the training images that do not have noise that is to be removed;
calculating a denoising operator for each said partition; and
providing the calculated denoising operator for use in performing a denoising operation for a noisy patch of an image to be denoised in response to identification of at least one said partition that corresponds to an initial denoising result for the noisy patch.

9. A system as described in claim 8, wherein the partitions are formed using a piece-wise or locally linear regression technique.

10. A system as described in claim 8, wherein the denoising operator is locally linear.

11. A system as described in claim 8, wherein the partitions are arranged in a tree-like structure.

12. A system as described in claim 8, wherein the initial denoising result is based at least in part on patch recurrence.

13. A method comprising:
forming a plurality of partitions of training samples of training images by one or more computing devices according to clean patches taken from the training images that do not have noise that is to be removed;
calculating a denoising operator by the one or more computing devices for each said partition; and
providing the calculated denoising operator by the one or more computing devices for use in performing a denoising operation for a noisy patch of an image in response to identification of at least one said partition that corresponds to an initial denoising result for the noisy patch.

14. A method as described in claim 13, wherein the partitions are formed using a piece-wise or locally linear regression technique.

15. A method as described in claim 13, wherein the denoising operator is locally linear.

16. A method as described in claim 13, wherein the partitions are arranged in a tree-like structure.

17. A method as described in claim 13, wherein the initial denoising result is based at least in part on patch recurrence.

18. A method as described in claim 1, wherein mean values of the initial denoising result for the noisy patch are added to the denoising result for the noisy patch after the denoising result is computed for the noisy patch.

19. A method as described in claim 1, wherein the initial denoising result for the noisy patch is computed using patches from within the image.

* * * * *